United States Patent [19]

Angioletti

[11] 4,234,266
[45] Nov. 18, 1980

[54] FLOATING BREAKWATER

[75] Inventor: Attilio Angioletti, Milan, Italy

[73] Assignee: Industrie Pirelli, S.p.A., Milan, Italy

[21] Appl. No.: 966,561

[22] Filed: Dec. 5, 1978

[30] Foreign Application Priority Data

Jan. 13, 1978 [IT] Italy ................ 19226 A/78

[51] Int. Cl.³ .................. E02B 3/06; B63B 35/34
[52] U.S. Cl. ................................. 405/26; 405/27
[58] Field of Search ............ 405/25, 26, 63–67

[56] References Cited

U.S. PATENT DOCUMENTS

| | | | |
|---|---|---|---|
| 3,221,884 | 12/1965 | Muller | 405/63 X |
| 3,369,664 | 2/1968 | Dahan | 405/68 |
| 3,533,240 | 10/1970 | Lesh | 405/26 |
| 3,710,577 | 1/1973 | Matheson | 405/64 |
| 3,777,689 | 12/1973 | Olsen et al. | 405/26 X |
| 4,048,802 | 9/1977 | Bowley | 405/26 |
| 4,098,086 | 7/1978 | Desty et al. | 405/26 |

FOREIGN PATENT DOCUMENTS

| | | | |
|---|---|---|---|
| 1581685 | 8/1969 | France | 405/26 |
| 1435780 | 5/1976 | United Kingdom | 405/26 |

*Primary Examiner*—Dennis L. Taylor
*Attorney, Agent, or Firm*—Stevens, Davis, Miller & Mosher

[57] ABSTRACT

A floating breakwater has two closed buoyant cylindrical members spaced laterally from each other and joined together in their spaced positions by longitudinally spaced flexible and inextensible strips such as rubberized fabric. Closed elongated tubular members are mounted on the cylindrical members where they will be above water. The breakwater is anchored to the bottom of the waterway by chains or the like and conventional anchors.

5 Claims, 1 Drawing Figure

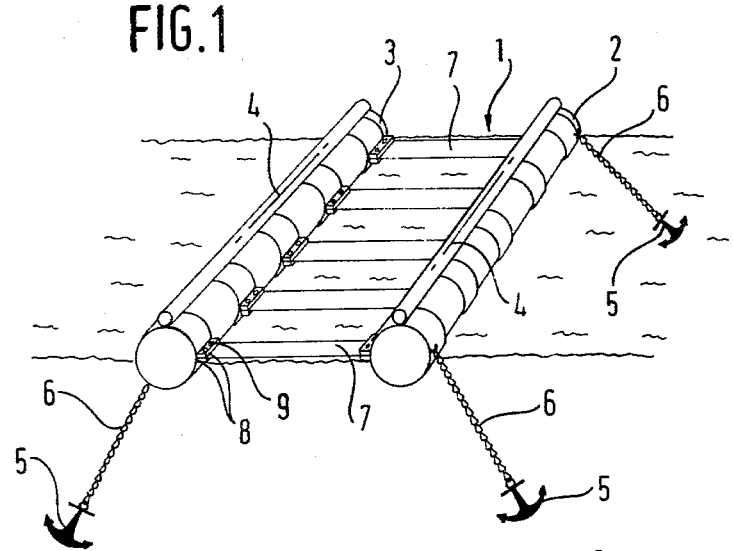
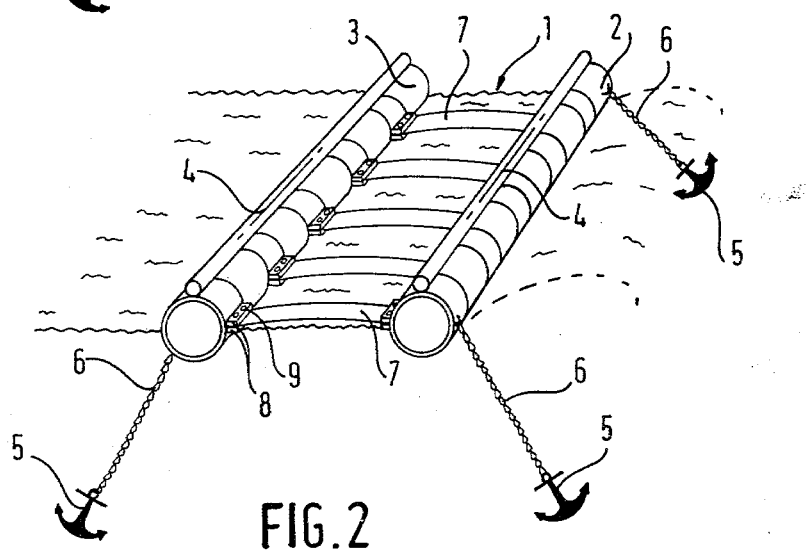

FLOATING BREAKWATER

This invention relates to floating breakwaters, and in particular, to mobile and flexible floating breakwater structures that are anchored by means of steel ropes or chains to stationary anchors or such similar means disposed at the bottom of a body of water in a position to protect a determined zone of the body of water from water current or wave motion.

Various types of mobile breakwater structures are known, which can be subdivided into two general groups:

floating breakwater structures-either rigid or flexible; and non-floating breakwater structures.

One mobile non-floating breakwater is formed by a plurality of pipes disposed on the bottom of the body of water, and provided with nozzles through which a pressurized fluid (air, or water for example) flows. The flow of the fluid is directed towards the surface of the water and its purpose is to counteract incoming waves on the surface of the body of water to abate their force. However, this type of a non-floating breakwater presents numerous drawbacks including the disadvantage of being effective only when the waves are of a modest dimension. Moreover, it can only be employed in shallow water.

Furthermore, the cost of operating this type of breakwater is rather high because it requires pumping-stations for keeping the flow of the fluid under pressure. These pumping-stations must be fed constantly, and hence, require a substantial consumption of energy.

The known mobile floating breakwaters can, in their turn, be subdivided into rigid or flexible structures as stated above.

A known type of a rigid floating breakwater comprises rigid floating structures provided with elements called "deflectors" which attenuate the force of the incoming waves by diverting the waves from the area to be protected.

This type of rigid floating breakwater may be anchored by conventional means to the bottom of a body of water in which it is immersed, but even this type of known rigid floating breakwater presents serious drawbacks. For example, the breakwater is effective only in relatively calm waters and, moreover, because of its rigidity, is frequently damaged when struck by high waves.

One known type of mobile floating breakwater is formed by a closed elongated body, generally having a circular crosssection anchored near the surface of the water in which it is immersed, and filled with appropriate fluids. This known flexible floating breakwater is anchored with its larger dimension disposed perpendicular to the direction in which the waves are moving.

The breakwater abates the energy of the waves buffetting against it either by means of its periods of oscillating movement, that are quite long with respect to the forces in action (i.e. the waves themselves), by creating a counterphasewave against the incoming waves or by dissipating the energy in the fluid contained therein. The known flexible mobile floating breakwater presents however, certain drawbacks, such as increasing a crosssection as the height and length of the incoming waves, increase.

For the purpose of neutralizing the effects of very large waves, several elongated, parallel closed bodies are bound together in contact with each other in such a way as to form a wall-like structure of very large crosssection. Alternately, several elongate closed bodies are placed in series in such a way as to abate each the waves that the preceding body has allowed to pass through.

An object of the present invention is to overcome the draw-backs of the known breakwaters and in particular to provide a flexible floating breakwater that insures excellent protection from wave motion for an enclosed area of water and any structures on or in the water lying behind the breakwater structure.

Other objects will become apparent from the following description with reference to the accompanying drawing wherein FIG. 1 is a perspective view of one embodiment of the invention at rest; and FIG. 2 is a perspective view of the breakwater of the invention associated with water waves.

The invention provides, generally speaking, a floating breakwater structure which comprises at least two elongated closed bodies which are to be disposed with their greater dimensions substantially perpendicular to the direction of the predominant incoming waves, and disposed side by side and spaced one from another, means capable of furnishing the desired trim to each elongated closed body, means capable of anchoring the extreme elongated closed bodies to the bottom of the body of water in which the said floating breakwater is immersed and means for connecting the elongated closed bodies to form zones of high turbulence within the portion of water existing between the elongated closed bodies.

In a more general form of the floating breakwater of the present invention, the floating breakwater comprises at least two elongated bodies each of which is provided with conventional means for anchoring it to the bottom of the body of water in which it is immersed, means for providing to each elongated closed body the desired trim and means for connecting together the two elongated bodies for creating a zone of high turbulence within the portion of water existing between the two elongated bodies, the elongated bodies being disposed substantially parallel to each other but spaced apart with their greater dimensions substantially perpendicular to the direction of the predominant incoming waves.

A preferred embodiment of the floating breakwater provided by the present invention is shown in FIGS. 1 and 2, respectively, in the state of rest, and under the action of an incoming wave. In the drawing, one embodiment of a floating breakwater 1 is shown in perspective. Floating breakwater 1 has two elongated closed bodies 2 and 3, with their longitudinal axes perpendicular to the direction of the water flow. The elongated closed bodies have, preferably, circular cross-sections perpendicular to their greater dimensions.

The elongated closed body can either have a flexible structure made from elastomeric and/or plastomeric material or made from a flexible and inextensible material, or they can have a rigid structure for example of metallic or rigid plastic material.

Regardless of whether the elongated closed bodies 2 and 3 are rigid or flexible, they are provided with conventional means (such as valves or openings—not shown in the drawing) for the admission into them of fluids or substances for conferring to the elongated closed bodies the desired mass.

In addition to this, the elongated closed bodies can be provided with transverse bulkheads (i.e., perpendicular to the greater dimension) not shown in the drawing, which close, partially at least the internal section of the elongated closed bodies.

External to the elongated closed body, tubular elements 4 are disposed in such a position which is the farthest point from the surface of the water. Tubular elements 4 are also provided with conventional means for the admission of fluid under pressure and are provided with the desired shape to impart to the elongated closed bodies 2 and 3 the desired configuration. The tubular elements 4, in an alternative embodiment not shown in the drawing, can be placed on the inside of the elongated closed members 2 and 3.

Each of these elongated closed bodies 2 and 3 is also provided with conventional means for anchoring it to the bottom of the waterway in which it is disposed.

In the embodiment shown in the drawing, the anchoring means comprises anchors 5 lying on the bottom of the waterway connected to the elongated closed bodies 2 and 3 by means of chains 6. Some tie-rods 7 join the two elongated closed bodies 2 and 3. Tie-rods 7 are designed to be capable of forming in the water between them a zone of high turbulence. In the particular embodiment represented in the drawing, the tie-rods 7 are constituted by strips of flexible and inextensible material (such as, for example, a rubberized fabric or a plastic material) wound at each end around a member 2 or 3.

The connection of the loose ends of the strips 7 to the strips 7 takes place by pressing the ends of the strips 7 and the body of strips 7 between two rigid plates 8 (of a metallic or plastic material, for example) joined together through bolts 9.

The strips 7 can be doubled-up in the tract between the two elongated closed bodies 2, 3 joining the two ends of the strip, for example, by gluing, welding or vulcanizing.

However, the presence of the rigid plates 8 and the bolts 9 is necessary for joining the strips 7 to the elongated closed bodies 2 and 3.

As an alternative to the just described embodiment, the tie-rods 7 can be flexible and may or may not be associated with means for exerting an elastic return pull on the elongated closed bodies 2 and 3. This means can be, for example, the material from which the tie-rods 7 are made. The tie-rods 7 may also be ropes, for example, metallic or of other material or chains.

Finally the tie-rods 7 that connect the two elongated closed bodies 2 and 3 can be one or more sheets of material similar to that of the strips 7 but substantially covering the entire zone of water between the two elongated closed bodies.

The operation of the floating breakwater, according to the present invention, can be described with reference, in particular, to FIG. 2.

In FIG. 2, the incoming waves are to the right of the floating breakwater 1, as shown in FIG. 2, while the protected calm zone lies to the left of floating breakwater 1-always as shown in FIG. 2.

The incoming wave meets during its passage first the elongated closed body 2 and becomes somewhat abated by its presence. The part of the wave that overcomes the elongated closed body 2, however, is subjected to the zone of strong turbulence between the two elongated closed bodies of the floating breakwater 1 and becomes completely abated.

The function of the elongated closed bodies 2 and 3 is not for overcoming the force of the waves by their presence, but to form a zone of strong turbulence and swirling of the water between the two elongated bodies 2 and 3. This turbulence is formed by relative movement of the two bodies towards and away from each other with the wave motion, but above all because of the tie-rods 7. The first of a series of waves that strike the floating breakwater 1, will find the two elongated closed bodies 2 and 3 in a state of rest and will separate them by a predetermined distance depending upon the height and the length of the waves that must be nullified and of other local physical characteristics that can be easily determined by a technician skilled in the art. It is also within the skill of a technician of the art to determine the optimum dimensions of the elongated closed bodies always depending upon the variables listed above.

The first wave striking the elongated closed body 2 moves it towards the elongated closed body 3. Thus, there is movement of the water between the two elongated closed bodies with tensioning of the ropes or chains that join the body 2 to the anchoring means lying at the bottom of the body of water. The crest of the wave overcomes the elongated closed body 2 making it descend into the waves that follow the crest. As a consequence of this, elongated closed body 2, recalled also by its own ropes that connect it to the anchoring means, begins to draw away from the elongated closed body 3. It must be noted that the crest of the first incoming wave cannnot find the zone of strong turbulence because the floating breakwater 1 was initially in a state of rest.

The crest of the first wave subsequently encounters the elongated closed body 3 which further nullifies it by its presence and begins to draw away the elongated closed body 3 from the elongated closed body 2.

At this point however, the tie-rods 7, become stretched and, in cooperation also with the elastic return pull of the two elongated closed bodies associated to said rods will cause the two elongated closed bodies to come together. The second wave, in striking the elongated closed body 2 pushes it further towards the elongated closed body 3.

At this point, the water between the two elongated closed bodies is obliged by the mutual drawing closer of the two elongated closed bodies 2 and 3 to assume strong vortex-like motions directed mainly towards the bottom, in such a way that the crest of the second incoming wave, once it has overcome the elongated closed body 2 finds a water barrier, i.e. a zone of high turbulence, that dissipates a considerable portion of the kinetic energy possessed by the wave.

As is known, about 70% of the kinetic energy of a wave is contained in the upper 20% of its depth.

As a consequence, the high turbulence and the vertical motions generated by the approaching and drawing apart of the two elongated closed bodies, must not descend very deeply in order to effectively interact with, and as a consequence absorb the kinetic energy of the incoming wave.

In fact, the floating breakwater according to the present invention, forms in the zone of water between the two elongated closed bodies, a water barrier whose water possesses a motion having strong vertical as well as turbulent components in such a way that the kinetic energy of the wave beating against the water barrier is dissipated.

The following experimental data having been found. With a breakwater of the type shown in the drawing where the diameters of the bodies 2 and 3 were 380 mm, the diameters of the closed elements 4 were 160 mm and the distance between the axes of the two elongated closed bodies 2 and 3 was 2000 mm for a total of length of the breakwater in the direction of the waves of about 2400 mm, it was found that more than 65% of the energy of waves having a length of up to 1.25 times the length of the breakwater itself was abated. (By percent abatement is meant the difference between the height of the wave upstream of the breakwater and the height of the wave downstream of the breakwater divided by the height of the wave upstream of the breakwater, expressed in percent).

The absorption of the energy of waves having a length up to that equal to the length of the breakwater was more than 70% by a breakwater of the type described having three elongated bodies like 2 and 3 secured together as described in lateral spaced relationship. The diameter of each of the elongated bodies was 380 mm and each body had an element, 4 of 160 mm diameter. The axes of adjacent bodies were 1500 mm apart and the length of the breakwater was 3400 mm.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A floating breakwater for protecting an area of a body of water from waves comprising at least a pair of cylindrical drum-like members, longitudinally spaced flexible and substantially inextensible strips connected at one end to one of said drum-like members and connected to another of said drum-like members at the other end, closed hollow tubular members of smaller cross section than the cylindrical members fixed to said cylindrical members above the water level and means for anchoring the first and last of said cylindrical members while afloat to the bottom of a body of water.

2. A floating breakwater comprising at least two elongated closed bodies disposed with their greater dimension substantially perpendicular to the predominant direction of incoming waves and disposed in parallel spaced relationship, means anchoring the first and last of said elongated closed bodies and flexible strips connecting adjacent elongated closed bodies to impart to them a to and fro motion whereby the upper part of the portion of water between adjacent elongated closed bodies assumes vertical and turbulent motions interacting and abating the incoming waves.

3. The floating breakwater of claim 2 comprising means for exercising a return pull to increase the to and fro motion of said elongated closed bodies.

4. The floating breakwater of claim 2 wherein the flexible strips are inextensible.

5. The floating breakwater of claim 2 wherein the flexible strips connecting the said elongated closed bodies to each other cover substantially the entire water surface and are of inextensible sheet material.

* * * * *

UNITED STATES PATENT AND TRADEMARK OFFICE
CERTIFICATE OF CORRECTION

PATENT NO. : 4,234,266
DATED : November 18, 1980
INVENTOR(S) : A. ANGIOLETTI

It is certified that error appears in the above-identified patent and that said Letters Patent are hereby corrected as shown below:

Col. 3, line 4, "tubular elements" should read ---closed tubes---

Col. 3, line 11, "tubular" should read ---closed---.

Signed and Sealed this

Thirtieth Day of June 1981

[SEAL]

Attest:

RENE D. TEGTMEYER

Attesting Officer

Acting Commissioner of Patents and Trademarks